Patented Nov. 24, 1942

2,302,770

UNITED STATES PATENT OFFICE 2,302,770

FLUORESCENT SCREEN

Stanley Thomas Henderson, Iver, and Ernest William Fogg, London, England, assignors to Electric & Musical Industries Limited, Hayes, Middlesex, England, a company of Great Britain No Drawing. Application February 9, 1940, Serial No. 318,132. In Great Britain February 25, 1939

1 Claim. (Cl. 250—81)

The present invention relates to fluorescent screens and has particular, but not exclusive, reference to fluorescent screens of the kind used in cathode ray tubes wherein the cathode ray beam is modulated over a wide range of current intensities and is produced at a high voltage as in the case of projection tubes for television signal reception.

In making fluorescent screens for use in cathode ray tubes where the cathode ray beam has a high current density and is produced at a high voltage, it is difficult to produce a screen which will give satisfactory performance as far as its emission is concerned and at the same time emit a white light under all conditions of excitation. Such screens are usually composed of mixtures of materials in which each material fluoresces with a different colour, the composition of the mixtures being adjusted so that the emission from the mixture as a whole appears to be white or approximately white. However, difficulty is experienced in obtaining a mixture in which the emission will be of satisfactory colour throughout the range of intensity through which the cathode ray may be required to vary owing to the fact that it is difficult to provide a mixture in which all the constituents maintain their emission in the correct proportion under conditions of heavy current load to which they are subject, for example, in the production of very intense images for the production of television pictures. In certain cases, as pointed out in British patent specification No. 513,518, the constituents of a mixture of which a fluorescent screen is composed can be so selected that the variation in the colour of the light emitted by the screen with a varying current intensity in the bombarding ray is of such a character that the change in colour with brightness will appear more or less natural and will not be unpleasant. It is however desirable to provide a screen in which the colour of the light emitted can be made to be substantially constant whatever the intensity of the bombarding current, the screen being of such a character as to give an intense fluorescence at high current intensities.

The object of the present invention is to provide a fluorescent screen of high emission efficiency which will emit substantially white light for all conditions of bombardment when the current intensity of a bombarding ray is varied over a wide range.

In accordance with the present invention a fluorescent screen is provided which is composed of a mixture of calcium sulphide and a substance giving a yellow fluorescence. The substance which emits the yellow fluorescence may be a zinc beryllium silicate. Such a mixture is somewhat similar to certain of the mixtures described in the specification of British Patent No. 513,518 in that the calcium sulphide emits a blue fluorescence whilst the zinc beryllium silicate emits a yellow fluorescence and the calcium sulphide tends to saturate slightly before the zinc beryllium silicate so that the emission from the mixture at high current intensities tends to become more yellow, as in the case described in the aforesaid specification. However, in the case of the present mixture the variation in the emission from the components corresponds so closely that the colour of the light emitted from the mixture may be regarded as substantially unchanging. The zinc beryllium silicate used in the screen in accordance with the invention may be zinc beryllium ortho-silicate prepared as described in British patent specification No. 478,302, or zinc beryllium silicate in which the molecular proportions are such that there is less than one molecule of silica present for every two molecules of the metallic oxides as described, for example, in the aforesaid British patent specification No. 513,518. If desired, other materials giving a yellow fluorescence may be used, for example, zinc borate activated with manganese. The calcium sulphide can be made and activated with copper in the presence of various fluxes as described for example in the section headed "kalziumsulfidphosphor" commencing at page 324 in volume 23 of Handbuch der Experimentalphysik, 1938 edition, and its fluorescent emission is then found to lie principally in two bands with their maxima at about 4700 to 4800 and 4200 to 4300 A. units respectively. In addition, a method for the preparation of calcium sulphide can be used similar to that described for the preparation of magnesium sulphide at page 400 of the above mentioned handbuch. This further method involves the use of nitrogen to provide an inert atmosphere. If desired, carbon dioxide can be used instead of nitrogen. By mixing the activated calcium sulphide with zinc beryllium silicate which has two emission bands with maxima at about 5400 and 5900 A. units, a mixture which fluoresces with a white, yellowish-white, or bluish-white fluorescence, of which the tint scarcely alters with variation in the intensity of the exciting current, is obtained. The relative proportions of the two maxima of emission from the silicate can be varied by changing the proportion of the constituents of the silicate, and similar changes can be made in the relative proportions of the emissions in the two bands mentioned in the case of the calcium sulphide by altering the copper content in the activator and the flux used. Thus the conditions can be chosen to give the correct components to produce any desired shade of white, or approximately white, light. Thus it is clear, for example, that to produce a given resultant colour, calcium sulphide with unusually high proportion of the greenish-blue band at 4700 to 4800 Å. should be mixed with a zinc beryllium silicate with a somewhat reduced green band at 5400 Å., otherwise the combination colour will appear too green in tint. If desirable the tint may be corrected by small additions of other components provided that they have similar emission characteristics with regard to current as the main components. For example willemite might be added in small amounts if the tint were otherwise insufficiently green.

In preparing a mixture according to the invention the components of the mixture may be ground together and settled on the base, or end plate, of a cathode ray tube in the usual manner, except that, as the calcium-sulphide is decomposed by water, a non-aqueous medium must be used for the grinding and settling. Suitable media are carbon tetra-chloride, dry acetone, anhydrous methyl or ethyl alcohols or mixtures of these media. It is also desirable that the screen should be settled as shortly before evacuation of the tube as possible in order to reduce the time for which the air is in contact with the screen so that there is a minimum likelihood of the screen being affected by the action of the moisture in the atmosphere. If desired, special precautions can be taken to exclude all moisture from the screen after it has been settled. Otherwise, processing of the tube is carried out in the usual manner.

For example, in carrying the invention into practice, calcium sulphide is prepared without an activator or flux addition, as described in the Handbuch der Experimentalphysik, as above referred to, and the sulphide is then treated with an aqueous solution containing sodium sulphate to the extent of 5% of the weight of the sulphide, and an amount of copper sulphate containing copper to the extent of 0.05% of the weight of sulphide, the sulphide being then dried rapidly after treatment and re-heated with sulphur in an atmosphere of nitrogen and carbon disulphide for fifteen minutes at 900° C. to 1000° C. For a white mixture this is ground with zinc beryllium silicate in the proportions of two parts by weight of calcium sulphide to three parts of the silicate. These proportions may be varied according to the required colour in the fluorescence emitted by the screen and the brightness of the components, for example, between the cases in which the proportions of calcium sulphide to zinc beryllium silicate are as 2:1 and 1:3.

We claim:

A fluorescent screen comprising a mixture of blue cathodo-luminescent calcium sulphide and yellow cathodo-luminescent zinc beryllium silicate, wherein the limits of the ratio of weight of said sulphide to said silicate are between .2 to 1 and 1 to 3, said screen having substantially invariant spectral emission over a wide range of intensity of electronic bombardment.

STANLEY THOMAS HENDERSON.
ERNEST WILLIAM FOGG.